US010562126B2

(12) United States Patent
Chergui et al.

(10) Patent No.: US 10,562,126 B2
(45) Date of Patent: Feb. 18, 2020

(54) METHOD FOR RESISTANCE SPOT WELDING OF A SANDWICH MATERIAL AND CORRESPONDING DEVICE

(71) Applicants: ThyssenKrupp Steel Europe AG, Duisburg (DE); ThyssenKrupp AG, Essen (DE)

(72) Inventors: Azeddine Chergui, Dortmund (DE); Andreas Niesen, Klausen (DE)

(73) Assignees: ThyssenKrupp Steel Europe AG, Duisburg (DE); ThyssenKrupp AG, Essen (DE)

( * ) Notice: Subject to any disclaimer, the term of this patent is extended or adjusted under 35 U.S.C. 154(b) by 0 days.

(21) Appl. No.: 15/317,773

(22) PCT Filed: Jun. 12, 2015

(86) PCT No.: PCT/EP2015/063210
§ 371 (c)(1),
(2) Date: Dec. 9, 2016

(87) PCT Pub. No.: WO2015/193197
PCT Pub. Date: Dec. 23, 2015

(65) Prior Publication Data
US 2017/0120367 A1    May 4, 2017

(30) Foreign Application Priority Data
Jun. 17, 2014   (DE) ..................... 10 2014 008 623

(51) Int. Cl.
*B23K 11/11*   (2006.01)
*B23K 11/10*   (2006.01)
*B23K 103/16*  (2006.01)

(52) U.S. Cl.
CPC ....... *B23K 11/115* (2013.01); *B23K 2103/172* (2018.08)

(58) Field of Classification Search
CPC ................... B23K 11/10–115; B23K 11/16
See application file for complete search history.

(56) References Cited

U.S. PATENT DOCUMENTS

| 3,909,581 A | 9/1975 | Stone |
| 5,021,627 A | 6/1991 | Bersch |
| 5,866,868 A * | 2/1999 | Hirane ................ B23K 11/115 219/110 |
| 9,517,526 B2 * | 12/2016 | Sakamoto ............ B23K 11/115 |

(Continued)

FOREIGN PATENT DOCUMENTS

| CN | 103180082 A | 6/2013 |
| CN | 103534054 A | 1/2014 |

(Continued)

OTHER PUBLICATIONS

English translation of WO 2013020636 A1 to Alexander Voigt, published Feb. 14, 2013.*

(Continued)

*Primary Examiner* — Michael A Laflame, Jr.
(74) *Attorney, Agent, or Firm* — Lathrop GPM LLP

(57) ABSTRACT

A method for resistance spot welding a metallic material to a sandwich material that includes a plastic core layer with two metallic cover layers may involve positioning a first electrode onto a surface of the metallic material, positioning an opposing second electrode onto a surface of the metallic cover layer that is apart from the metallic material, heating a region to be welded in such a manner that the plastic core layer in the region to be welded softens, moving the electrodes together to displace the softened plastic from the region to be welded until the two cover layers make contact with one another in a contact region, and welding the metallic cover layers to the metallic material in the contact region by a flow of electrical current across the first and second electrodes. A device by way of which a simple structure with a limited heat-affected zone is also disclosed for performing such methods.

8 Claims, 2 Drawing Sheets

(56) References Cited

U.S. PATENT DOCUMENTS

| | | | | |
|---|---|---|---|---|
| 2005/0029233 | A1* | 2/2005 | Schuhen | B23K 11/115 219/86.22 |
| 2010/0024558 | A1* | 2/2010 | Shibata | B23K 11/115 73/628 |
| 2012/0055910 | A1* | 3/2012 | Sakai | B23K 11/115 219/127 |
| 2013/0248505 | A1* | 9/2013 | Anayama | B23K 11/115 219/130.01 |
| 2013/0337284 | A1* | 12/2013 | Onda | B23K 11/115 428/594 |
| 2014/0154494 | A1* | 6/2014 | Kato | B23K 11/115 428/300.7 |
| 2015/0136742 | A1* | 5/2015 | Morita | B23K 11/11 219/86.7 |
| 2016/0184919 | A1 | 6/2016 | Chergui | |

FOREIGN PATENT DOCUMENTS

| | | |
|---|---|---|
| CN | 103702792 A | 4/2014 |
| DE | 10 2011 109 708 A1 | 2/2013 |
| DE | 10 2012 106 521 A1 | 1/2014 |
| DE | 10 2013 108 563 A1 | 2/2015 |
| FR | 2 638 668 A | 5/1990 |
| GB | 775428 | 5/1957 |
| JP | S5-5109583 | 8/1980 |
| JP | S6068180 A | 4/1985 |
| JP | H06-292982 | 10/1994 |
| JP | H07-68387 | 3/1995 |
| JP | 2012-055897 A | 3/2012 |

OTHER PUBLICATIONS

English translation of EP 2353766 to Dietrich, Simon, published Jan. 2011.*
English translation of International Search Report for International patent application No. PCT/EP2015/063210; dated Oct. 9, 2015.
English language Abstract for DE 10 2011 109 708 A1 listed above.
Chinese Office Action issued in corresponding application No. 2015800330466, dated Jun. 12, 2018.

* cited by examiner

METHOD FOR RESISTANCE SPOT WELDING OF A SANDWICH MATERIAL AND CORRESPONDING DEVICE

CROSS REFERENCE TO RELATED APPLICATIONS

This application is a U.S. National Stage Entry of International Patent Application Serial Number PCT/EP2015/063210, filed Jun. 12, 2015, which claims priority to German Patent Application No. DE 10 2014 008 623.2 filed Jun. 17, 2014, the entire contents of both of which are incorporated herein by reference.

FIELD

The present disclosure generally relates to methods for resistance spot welding a plastic core layer with two metallic cover layers.

BACKGROUND

Sandwich materials, which consist of different materials, combine contradictory properties which cannot be provided by monolithic materials. Thus, for example, a sandwich material consisting of a plastic core layer with two metallic cover layers, particularly when the plastic core layer is provided with a thickness which is greater than the thickness of the metal cover layers, has comparable properties to a monolithic material, with a reduced weight. On account of the plastic core layer arranged between the metal cover layers and separating the two metal cover layers from one another in an insulating manner, the resistance spot welding of a sandwich material with at least one further metallic material was to date very difficult and could only be carried out with a high outlay on apparatus. Resistance spot welding methods of the generic type are known from the prior art.

The German laid-open specification DE 10 2011 109 708 A1 discloses a method for the resistance spot welding of a sandwich component with a further metal component, in which a first electrode is placed onto the surface of the metal component and a second electrode is placed in an opposing manner onto the surface of the sandwich component at the site to be welded, and the plastic at the site to be welded is heated, wherein the temperature of the electrodes is controlled, and, by moving the electrodes together, the softened plastic is displaced out of the region to be welded until the cover layers of the sandwich component come into electrical contact. By the application of an electrical current across the two electrodes, a welded connection is formed between the cover layers of the sandwich component and the metal component. It is disadvantageous here that the method has very high processing times and the corresponding device has a very complex structure.

The German patent application DE 10 2013 108 563 A1 discloses a method for the resistance spot welding of a sandwich component with a metal component, in which a second electric circuit is used between two electrodes for welding the sandwich component with the metal component. The plastic is heated at the site to be welded by a first electric circuit, which is energized by way of the same current/voltage source as the second electric circuit and is shiftable or disengageable. The current for heating energizes the electrode which lies against the surface of the metal component, and conducts the current into the metal component. The current is fed back to the current/voltage source by a current bridge arranged in electrical contact with the metal component. The distance or the path between the feeding electrode and the power-tapping current bridge can be chosen to be too great, as a result of which the heat introduced over this distance can have a negative effect in the sandwich material; by way of example, delamination can occur in this region. There is therefore further potential for improvement.

DETAILED DESCRIPTION

Figure 1A:
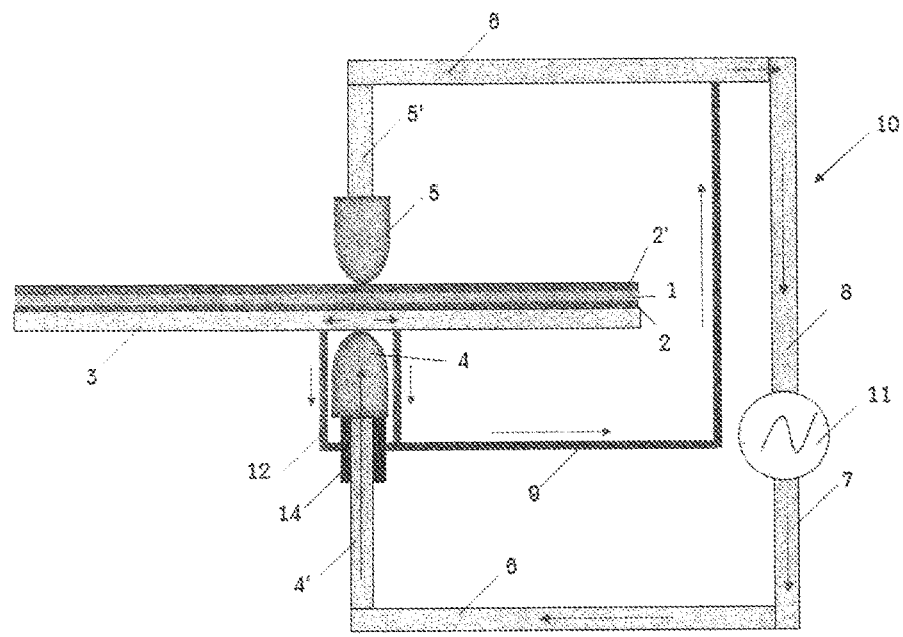
FIG. 1a is a schematic sectional view of an example device at a first point in time where a region of plastic to be welded is heated.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to methods for resistance spot welding a sandwich material comprising a plastic core layer and two metallic cover layers, with at least one metallic material, with a first electrode that is placed onto the surface of the metallic material, and with an opposing second electrode that is placed onto the surface of the cover layer that is arranged on the far side of the metallic material. The region to be welded may be heated in such a manner that the plastic in the region to be welded softens and, by moving the electrodes together, the softened plastic is displaced from the region to be welded until the two cover layers make contact with one another. The cover layers may then be welded with the metallic material in the contact region by a flow of electrical current across the first and second electrodes. In addition, the present disclosure generally relates to devices for resistance spot welding of a sandwich material with at least one metallic material. In some examples, a device may comprise at least a first electrode support with a first electrode and an opposing second electrode support with a second electrode, which are movable relative to one another. The device may further comprise a current/voltage source and current-carrying lines.

To this end, one example object of the present disclosure is to provide a method for the resistance spot welding of sandwich materials and also a corresponding device by way of which a simple structure with a limited heat-affected zone can be provided.

Said object for a method of the generic type is achieved by virtue of the fact that the first electrode and a contacting body, which are placed adjacent to one another on the surface of the metallic material, the plastic is heated in the region to be welded by a flow of electrical current across the first electrode and the contacting body, and the contacting body is electrically connected via a current-feedback line to a current-feedback line of the second electrode.

The inventors have established that, through the provision of the first electrode and a contacting body, which are placed adjacent to one another on the surface of the metallic material, with the plastic being heated in the region to be welded by a flow of electrical current across the first electrode and the contacting body, it is possible to locally delimit the heat-affected zone during the heating of the plastic to the region to be welded. In order to make it possible to provide a flow of electrical current, the contacting body is connected in a current-conducting manner to a current-feedback line of the second electrode as a parallel connection, and as a result the electric circuit is closed.

According to a first embodiment of the method according to the invention, the electrical current is kept constant until the two cover layers make contact, preferably at a low set current. This has the advantage that the plastic is not heated too quickly and spatter upon first contact of the cover sheets, which can lead to undesirable bubble formation, is substantially suppressed. Depending on the combination of the sandwich material and metallic material which is to be welded, the currents can be determined empirically.

According to a further embodiment of the method according to the invention, after the two cover layers make contact, the flow of electrical current is maintained and essentially continues to flow across the first and second electrode to produce a weld spot. This has the advantage that no additional control elements or additional mechanical apparatus are required.

The object for a device of the generic type is achieved by virtue of the fact that a contacting body is provided at the first electrode support, these being arranged adjacent to one another, and the contacting body is electrically connected via a current-feedback line to a current-feedback line of the second electrode.

As already stated above, the first electrode support or electrode and the contacting body, which are arranged adjacent to one another, make it possible for the heat-affected zone to be delimited during the heating of the plastic to the region to be welded and for delamination of the sandwich material in the region surrounding the welding region to be effectively prevented. The contacting body preferably extends coaxially to the first electrode support.

According to a further embodiment of the device according to the invention, the contacting body is arranged in a resilient manner on the first electrode support. In the unloaded spring state, the contacting body protrudes beyond the first electrode, such that a load of force to the first electrode support counter to the metallic material moves the contacting body in relation to the first electrode support, until the first electrode comes into contact with the surface of the metallic material. The resilient arrangement brings about a preload force, as a result of which it can advantageously be ensured that the contact resistance between the contacting body and monolithic material becomes smaller with an increasing preload force of the spring. This can prevent possible adhesion of the contacting body on the monolithic material.

According to a further embodiment of the device according to the invention, a non-conductive material, in particular a sleeve, preferably a sliding sleeve, is arranged between the electrode support and the contacting body. It is thereby possible to effectively prevent a short circuit between the preferably current-feeding first electrode and the current-discharging contacting body.

In a further embodiment of the device according to the invention, the contacting body comprises a contacting region, which surrounds the first electrode in an annular manner. This has the advantage that the current can flow uniformly from the first electrode radially in the direction of the contacting region. Alternatively, the contacting region surrounds the first electrode partially. This embodiment can be used, for example, when accessibility to the welding regions is restricted, for example in the case of components which comprise a narrow joining flange. No limits are set on the design of the contacting region, and therefore the latter can be adapted individually to the given requirement.

The device is preferably in the form of a spot-welding tongs, which can be installed on a conventional welding robot easily and without a high level of expenditure.

With reference now to the figures, the present disclosure will be explained in more detail on the basis of drawings that show exemplary embodiments, wherein identical or similar parts are provided with the same reference numerals.

Figure 1B:
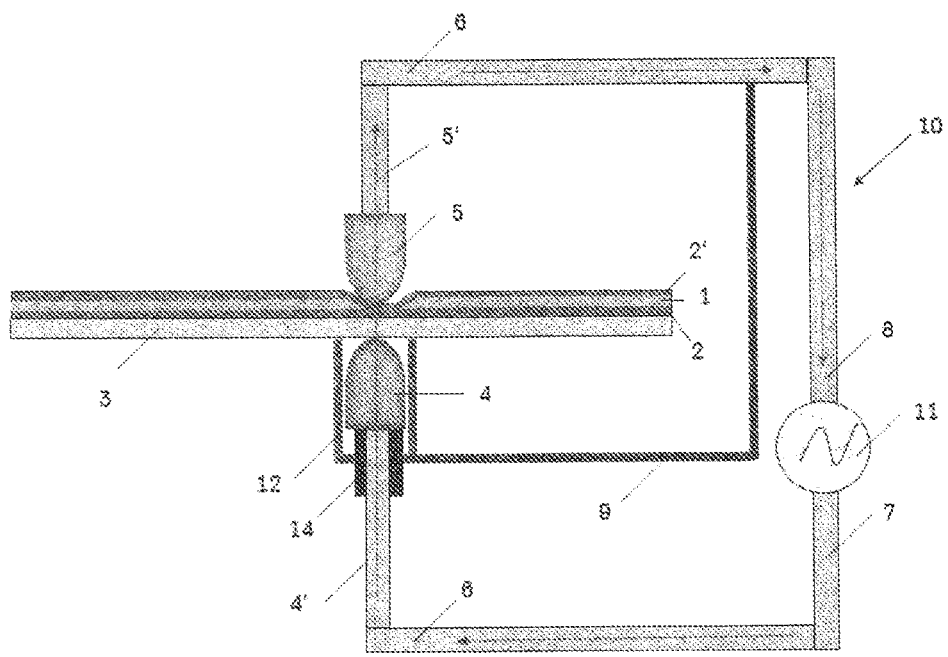
FIG. 1b is a schematic sectional view of the example device of FIG. 1a at a second point in time where a welding phase is initiated.

FIGS. 1a and 1b show, in a schematic sectional view, a first exemplary embodiment of a device according to the invention at two different points in time as the method according to the invention is being carried out. These figures show a sandwich material which consists of a plastic core layer (1), preferably of a thermoplastic core layer with two metallic cover layers (2, 2'), preferably with steel cover layers. The thickness of the plastic core layer is preferably designed to be greater than the thickness of the metallic cover layers. The sandwich material is welded with a metallic material (3), preferably with a steel material. For this purpose, provision is made of a first electrode (4), which is connected to a first electrode support (4'), and an opposing second electrode (5), which in turn is connected to a second electrode support (5'), the first electrode (4) being placed onto the surface of the metallic material (3) and the second electrode (5) being placed onto the surface of the metallic cover layer (2') which is on the far side of the metallic material. The device according to the invention is in the form of a spot-welding tongs (10), which has a C shape with two tong arms (6) on which the electrode supports (4', 5') are arranged. A contacting body (12) is provided at the first electrode support (4') and is arranged adjacent to the first electrode support (4'), the contacting body (12) extending coaxially to the first electrode support (4') and the contacting body comprising a contacting region (13), which surrounds the first electrode (4) in an annular manner, for example. Provision is furthermore made of a current/voltage source (11) and current-carrying lines (7, 8, 9), the first electrode being connected to a current-feeding line (7) and the second electrode (5) being connected to a current-feedback line (8), which form the electric circuit required for the welding process. A further current-feedback line (9) is provided between the contacting body (12) and the current-feedback line (8) of the second electrode (5) and serves to produce a parallel connection in order to bring about heating of the plastic in the region to be welded. In order to avoid a short circuit, an electrically non-conductive material (14), for example in the form of a coating or a sleeve, is arranged between the first electrode support (4') and the contacting body (12).

FIG. 1a shows the phase of heating of the plastic in the region to be welded. In this phase, the first electrode (4) and the contacting region (13) of the contacting body (12) are placed onto the surface of the metallic material (3). Opposite, the second electrode (5) is placed onto the surface of the metallic cover layer (2') which is on the far side of the metallic material. By activating a current, the latter flows (denoted by the arrows) from the current/voltage source (11) through the current-feeding line (7) to the first electrode (4), which is in electrical contact with the metallic material (3). The contacting region (13) of the contacting body (12) has an annular form, for example, and is likewise in electrical contact with the metallic material, such that the current can flow uniformly from the first electrode (4) radially in the direction of the contacting region (13). As a result, the heat-affected zone can be delimited locally to the region to be welded. The current flows further through the current-feedback line (9), which is electrically connected to the contacting body (12), via a parallel connection, the current-feedback line (9) being electrically connected to the current-feedback line (8) of the second electrode (5). The current flows back to the current/voltage source (11) through the current-feedback line (8) of the second electrode (5). The aforementioned flow of electrical current, which is kept substantially constant, initially brings about heating in the metallic material (3). Through heat conduction, the heat reaches the metallic cover sheet (2), through which in turn the heat is forwarded into the plastic core. As a result of the heat input, the plastic in the region to be welded softens and is displaced from the region to be welded by moving the electrode supports (4', 5') together.

If the two cover layers (2, 2') are in electrical contact, the welding phase is initiated as per FIG. 1b, wherein, after the two cover layers (2, 2') make contact, the flow of electrical current is maintained, and wherein the current continues to flow across the first and second electrode (4, 5) to produce a weld spot (indicated by the arrows).

Figure 2:
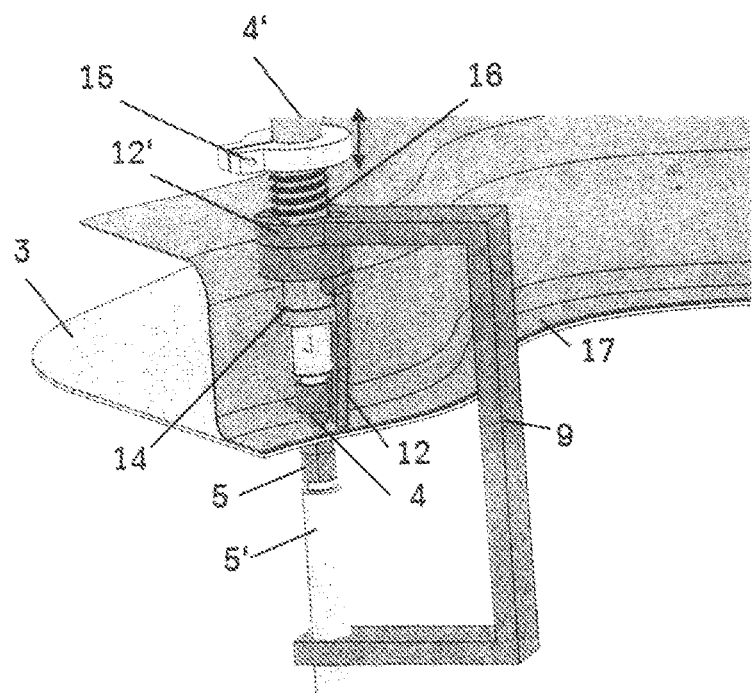
FIG. 2 is a perspective view of an example device wherein a sandwich material shaped with a hat profile is welded with a metallic material.

FIG. 2 shows a second exemplary embodiment of a device according to the invention in a perspective view. A sandwich material shaped with a hat profile is welded with a metallic material, which undergoes resistance spot welding for example as a locking plate in the flange region (17) of the sandwich material. The heating and welding phases are effected in a manner analogous to the above-described procedure. In contrast to the first exemplary embodiment, the contacting body (12) is arranged in a resilient manner by way of a spring (16) on the first electrode support (4'), with a stop (15) being fastened preferably adjustably (see arrow) on the first electrode support (4') in order to thereby make it possible to individually set the preload force of the contacting body (12). As the preload force of the spring (16) increases, the contact resistance between contacting body (12) and monolithic material (3) decreases. Possible adhesion of the contacting body (12) on the monolithic material (3) can thereby be prevented. In order to avoid a short circuit between the first electrode support (4') and the contacting body (12), provision is made therebetween of an electrically non-conductive material (14), for example a sleeve, preferably a sliding sleeve, which allows for a relative movement of the resiliently arranged contacting body (12) without damage. In its upper region, the contacting body (12) comprises a for example integrally formed protrusion (12'), which serves to form an electrical link/connection with the current-feedback line (9), which is in the form of a copper strip for example, and which in turn is electrically connected to the current-feedback line (8) of the second electrode (5). Alternatively, and not shown here, the current-feedback line (9) of the contacting body (12) can be arranged parallel to the current-feeding line (7) of the first electrode (4). Furthermore, the contacting region (13) of the contacting body partially surrounds the first electrode (4). This embodiment is preferably used when accessibility to the welding region, as is shown in this exemplary embodiment, is limited.

Figure 3:
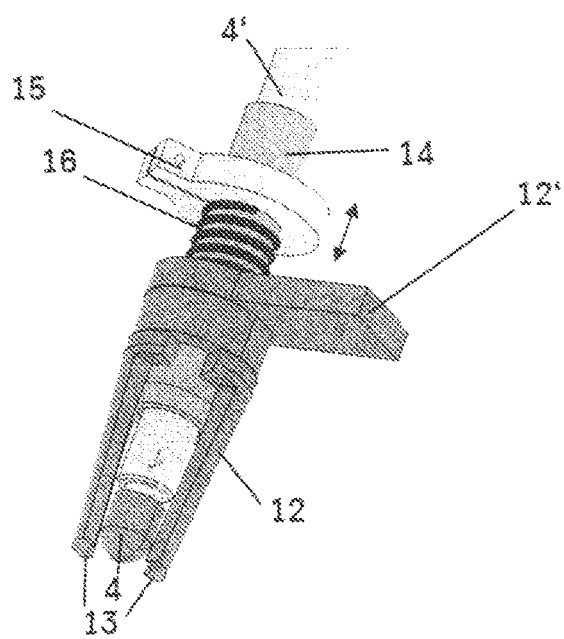
FIG. 3 is a perspective view of still another example device wherein an example contacting body comprises a contacting region that partially surrounds a first electrode and is divided over two partial regions, as a result of which a symmetrical flow of current can be set between the first electrode and the partial regions of the contacting body.

FIG. 3 shows a third exemplary embodiment of a device according to the invention in a perspective view. In contrast to the second exemplary embodiment, the contacting body (12) comprises a contacting region (13) which partially surrounds the first electrode (4) and which is divided over two partial regions, as a result of which a symmetrical flow of current can be set between the first electrode (4) and the partial regions of the contacting body (12). The two partial regions also have a positive effect on the device, since they subject the device according to the invention to symmetrical loading as the force is being applied to the electrode supports (4', 5').

LIST OF REFERENCE SIGNS

1 Plastic core layer
2, 2' Metallic cover layer
3 Metallic material
4 First electrode
4' First electrode support
5 Second electrode
5' Second electrode support
6 Tong arm
7 Current-feeding line of the first electrode
8 Current-feedback line of the second electrode
9 Current-feedback line of the contacting body
10 Spot-welding tongs
11 Current/voltage source
12 Contacting body
12' Protrusion
13 Contacting region
14 Electrically non-conductive material
15 Stop
16 Spring
17 Flange region

What is claimed is:

1. A method for resistance spot welding a metallic material with a sandwich material that includes a plastic core layer and two metallic cover layers, the method comprising:
  positioning a first electrode and a contacting body onto a surface of the metallic material, wherein the first electrode and the contacting body are adjacent to one another;
  positioning a second electrode opposing the first electrode onto a surface of the metallic cover layer that is apart from the metallic material;
  heating a region to be welded such that the plastic core layer in the region to be welded softens, wherein the heating occurs by a flow of electrical current across the first electrode and the contacting body, wherein the contacting body is electrically connected via a current-feedback line to a current-feedback line of the second electrode as a parallel connection;
  bringing the first and second electrodes together to displace the softened plastic core layer from the region to be welded until the two metallic cover layers contact one another in a contact region; and welding the two metallic cover layers with the metallic material in the contact region by a flow of electrical current across the first and second electrodes;

wherein the contacting body collects current from the first electrode, and directly conducts the collected current to the current-feedback line of the second electrode.

2. The method of claim 1 wherein the flow of electrical current across the first electrode and the contacting body is kept constant until the two metallic cover layers make contact.

3. The method of claim 1 wherein after the two metallic cover layers make contact the flow of electrical current is maintained and flows across substantially the first and second electrodes to produce a weld spot.

4. A method for resistance spot welding a metallic material with a sandwich material that includes a plastic core layer and two metallic cover layers, the method comprising:

heating a region to be welded such that the plastic core layer in the region to be welded softens, wherein the heating occurs by a flow of electrical current from a first electrode, through the metallic material, and to a contacting body, with the first electrode and the contacting body being in contact with the metallic material;

bringing the first electrode and a second electrode that opposes the first electrode together to displace the softened plastic core layer from the region to be welded until the two metallic cover layers contact one another in a contact region; and welding the two metallic cover layers with the metallic material in the contact region by a flow of electrical current across the first and second electrodes;

wherein the contacting body is electrically connected via a current-feedback line to a current-feedback line of the second electrode as a parallel connection to conduct current from the contacting body to the current-feedback line of the second electrode.

5. The method of claim 4 wherein the first electrode and the contacting body are adjacent to one another.

6. The method of claim 4 wherein the contacting body is electrically connected via a current-feedback line to a current-feedback line of the second electrode.

7. The method of claim 4 wherein the flow of electrical current across the first electrode and the contacting body is kept constant until the two metallic cover layers make contact.

8. The method of claim 4 wherein after the two metallic cover layers make contact the flow of electrical current is maintained and flows across substantially the first and second electrodes to produce a weld spot.

* * * * *